United States Patent [19]

Thomsen et al.

[11] Patent Number: 4,548,035

[45] Date of Patent: * Oct. 22, 1985

[54] HYDRAULIC CONTROL APPARATUS FOR A SERVOMOTOR

[75] Inventors: Svend E. Thomsen; Thorkild Christensen, both of Nordborg, Denmark

[73] Assignee: Danfoss A/S, Nordborg, Denmark

[*] Notice: The portion of the term of this patent subsequent to Dec. 21, 1999 has been disclaimed.

[21] Appl. No.: 441,105

[22] Filed: Nov. 12, 1982

[30] Foreign Application Priority Data

Nov. 23, 1981 [DE] Fed. Rep. of Germany ....... 3146302

[51] Int. Cl.⁴ .............................................. F15B 9/10
[52] U.S. Cl. ........................................ 60/384; 60/385
[58] Field of Search ................ 60/384, 385, 386, 387; 180/132

[56] References Cited

U.S. PATENT DOCUMENTS

| 4,364,302 | 12/1982 | Thomsen et al. | 60/384 |
| 4,385,674 | 5/1983 | Presley | 180/132 |
| 4,400,938 | 8/1983 | Ohe | 180/132 |

*Primary Examiner*—Charles T. Jordan
*Assistant Examiner*—Richard Klein
*Attorney, Agent, or Firm*—Wayne B. Easton

[57] ABSTRACT

The invention relates to a steering control unit for a bidirectional servomotor which is connectable to steerable wheels. A steering wheel controlled quantity setting unit of a known type has ports connectable to a pump and a return tank and two control ports through which metered quantities of fluid flow to opposite sides of the servomotor and to other parts of the apparatus for actuating the servomotor. A directional control valve for selectivity directing pressurized fluid from a power circuit to opposite sides of the servomotor is controlled by a control circuit containing the setting unit. A utility valve having pressure regulating and control and power valve capabilities is provided. In cases wherein the quantity setting apparatus is remotely located from the regulating valve the length of the signal channels add to the reaction time. Such reaction time is reduced herein by connecting the metering throttle as a fixed throttle between the regulating valve and quantity setting apparatus so that the regulating valve feeds a substantially constant quantity to the control cicuit, and that the quantity setting apparatus comprises a short circuit path to the tank which closes with an increase in the quantity.

6 Claims, 3 Drawing Figures

HYDRAULIC CONTROL APPARATUS FOR A SERVOMOTOR

The invention relates to a hydraulic control apparatus for a servo-motor, particularly for vehicle steering, comprising a control circuit having a quantity setting apparatus and a control valve in series, an operating circuit having a pressure regulator and an operating valve in series, and a regulating valve which precedes at least the inlet of the quantity setting apparatus and which is connected to the two sides of a metering throttle in the control circuit by way of pressure signal channels and is controlled in response to pressure drop at this metering throttle, the pressure regulator setting the pressure between itself and the operating valve (following pressure) to the pressure between the quantity setting apparatus and the control valve (control pressure), the inlets of the operating and control circuits being connected to a pump of constant compression and their outlets being connected for feeding the servo-motor in common, particularly the pressure regulator, control valve and operating valve being unified to form an amplifier valve having a common slide unit, the servo-motor being preceded by a directional valve, and the regulating valve also serving as a priority valve.

In a known apparatus of this kind U.S. Pat. No. 4,364,302, the metering throttle is an aperture in the interior of the quantity setting apparatus in series with a metering motor of this equipment and adjustable by a manual steering wheel and the metering motor. The quantity setting apparatus permits directional-dependent delivery of the set control quantity. In the neutral position, the quantity setting apparatus takes no pressure medium from the regulating valve. The piston of this regulating valve goes to its terminal position in which the entire pressure medium delivered by the pump is diverted through an outlet conduit and fed, for example, to an additional consumer.

If in this control apparatus the quantity setting apparatus is turned out of the neutral position to an operative position, some time elapses until the piston of the regulating valve has been displaced out of its rest position into the position required for the new operating condition. This results in a large reaction period which is often not desired. It is only when the piston is in its operative position that the pressure and quantity conditions necessary for adjusting the servo-motor will also have been set. In most cases, the quantity setting apparatus, which is generally provided with a manual steering wheel, is not disposed in the vicinity of the regulating valve. The pressure signal channels are therefore comparatively long and extend without protection between the quantity setting apparatus and the regulating valve.

The invention is based on the problem of providing a hydraulic control aparatus of the aforementioned kind in which short reaction periods are possible for fully attaining the particular operating condition.

This problem is solved according to the invention in that the metering throttle is connected as a fixed throttle between the regulating valve and quantity setting apparatus so that the regulating valve feeds a substantially constant quantity to the control circuit, and that the quantity setting apparatus comprises a short-circuit path which closes with an increase in the quantity and leads to the container.

In this arrangement, a particular quantity of pressure medium will flow by way of the fixed throttle to the inlet of the quantity setting apparatus and then further to the container, even in the neutral position of the quantity setting apparatus. Consequently, the distance to be travelled by the piston of the regulating valve when the quantity setting apparatus is moved from the neutral position to its operative position is substantially shorter than in the known control apparatus. The reaction period is correspondingly shorter. The normal operation of the control circuit is not affected because the fixed throttle and the throttle cross-section in the short-circuit path form a pressure divider, the pressure between the two throttles being effective as a control pressure and the constant quantity less the quantity diverted through the short-circuit path being available as the control quantity.

Another advantage is that no pressure signal channels need be provided between the regulating valve and the quantity setting apparatus and particularly the fixed metering throttle can be arranged in the vicinity of the regulating valve. This results in short channels with correspondingly low pressure losses.

It is also recommended that the fixed metering throttle be combined with the regulating valve to a structural unit which also comprises the pressure signal channels. This not only ensures the aforementioned short channel lengths but there is also no danger of a conduit fracture.

This structural unit may also comprise the pressure regulator, the control valve, the operating valve and possibly the directional valve to result in a very compact arrangement.

Whereas the operating circuit will normally also be controlled by way of the regulating valve, the arrangement could be such that the pump feeds the operating circuit directly. The throttling losses at the regulating valve will be correspondingly lower.

In a preferred embodiment, the fixed metering throttle and the regulating valve are so adapted to each other that the quantity flowing through the metering throttle is equal to the quantity necessary at maximum control speed of the quantity setting apparatus. This fixes an adequate but not excessively large quantity for the control circuit.

In practice, it has been found favourable for the quantity passed through the metering throttle to be about 10 to 15% of the quantity delivered by the pump. At maximum control of the servo-motor, this corresponds to an amplification factor of 8.

Preferred examples of the invention will now be described in more detail with reference to the drawing, wherein.

Figure 1:
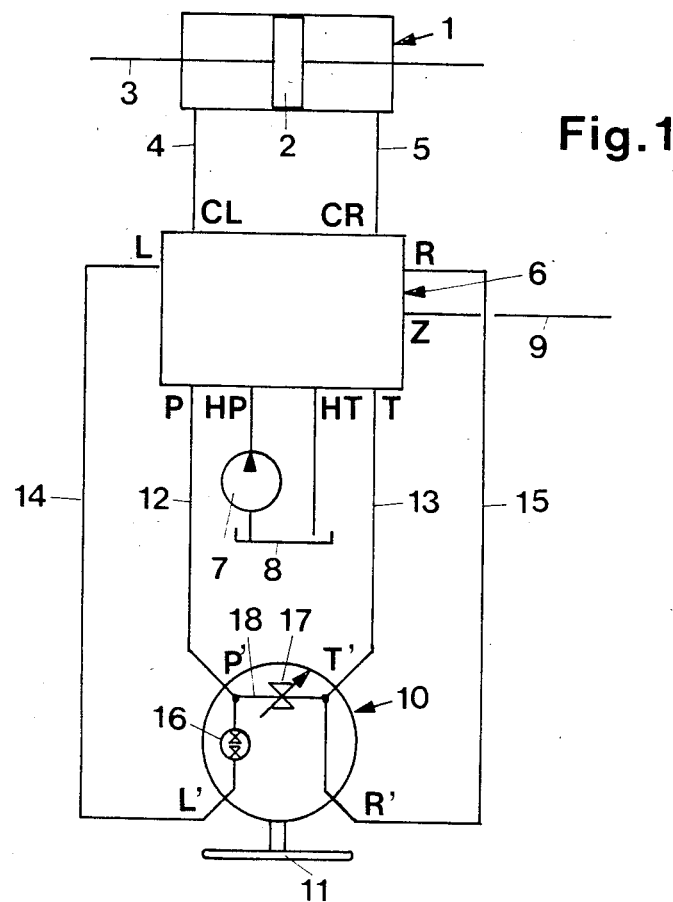
FIG. 1 is a circuit diagram of a servo-motor with a control apparatus according to the invention.

In the FIG. 1 circuit, a servo-motor 1, of which the piston 2 adjusts the wheels to be steered by way of a piston rod 3, is fed with pressure medium by way of a motor conduit 4 or 5 whilst the respective other motor conduit serves for the outflow.

A hydraulic structural unit 6 comprises a connection CL for the motor conduit 4 and a connection CR for the motor conduit 5. A pump 7 of constant compression is connected to the connection HP and a container 8 is connected to the connection HT. A consumer conduit 9 is connected to an additional connection Z. This consumer receives the excess quantity which is not required for the servo-motor 1. A quantity setting apparatus 10 with a manual steering wheel 11 is built into a convenient position of a vehicle to be steered at a spacing from the structural unit 6. A supply conduit 12 leads from the connection P to the connection P' of the quantity setting means 10. From the connection T' thereof, an outlet conduit 13 leads to the connection T of the structural unit 6. A connection L' of the quantity setting apparatus 10 is connected by way of a control conduit 14 to the connection L of the structural unit 6 and a connection R' of the quantity setting apparatus 10 is connected by way of a control conduit 15 to the connection R of the structural unit 6.

The quantity setting apparatus 10 can for example be of the Danfoss-Orbitrol type in which the connection P' is selectively connectible by way of a metering motor 16 to the connection L' or R'. A throttle cross-section 17 in a short-circuit path 18 connecting the connections P' and T' is fully open in the neutral position. By turning the manual steering wheel 11, this throttle cross-section is reduced. The metering motor 16 causes a following operation such that the throttle cross-section 17 reassumes the fully open position after the passage of a quantity predetermined by the angle turned by the steering wheel 11. Another throttle cross-section changing in the opposite sense to the throttle cross-section 17 can be in series with the metering motor 16.

Figure 2:
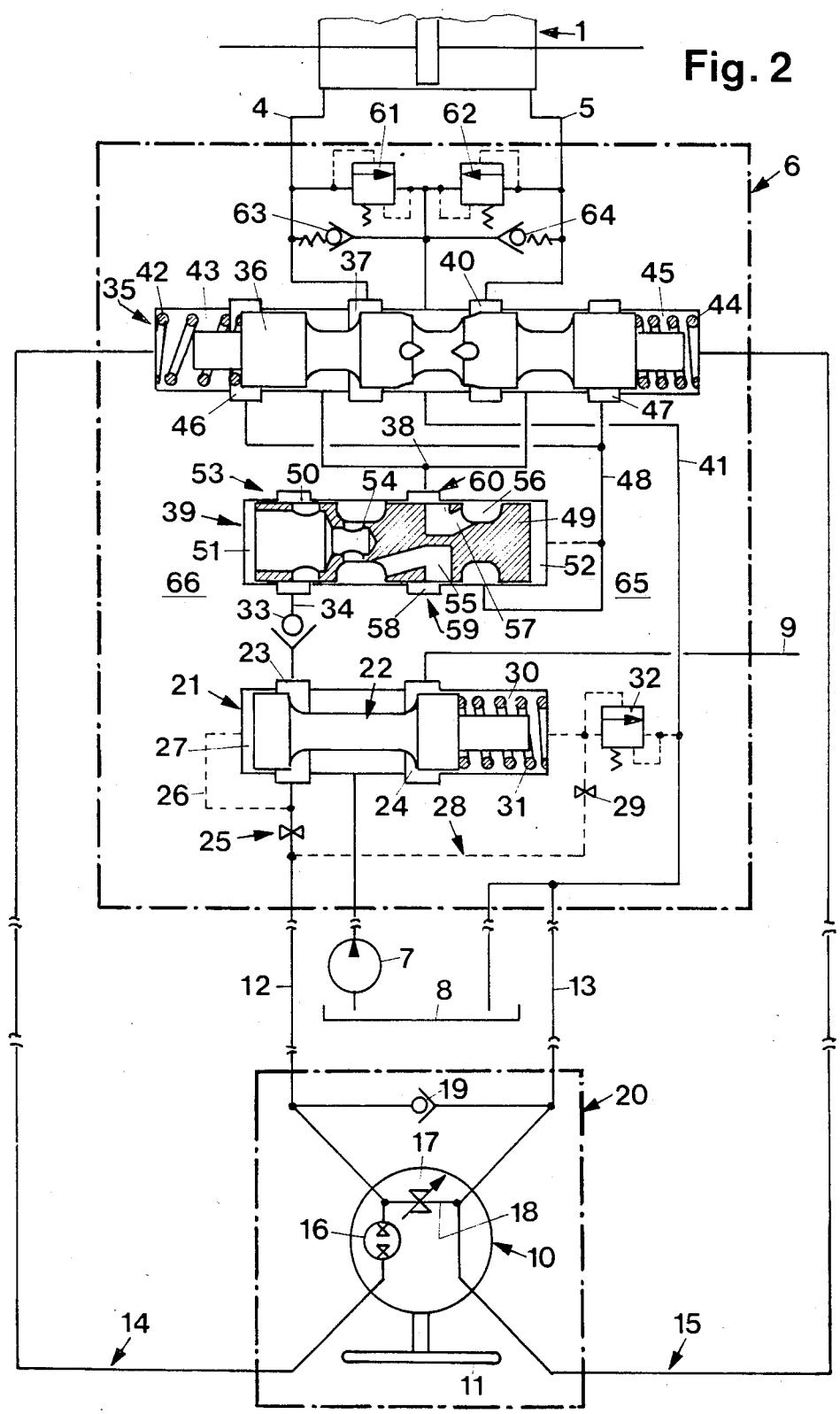
FIG. 2 is a more detailed circuit diagram of a first embodiment.

The construction of the FIG. 1 circuit is clearer from FIG. 2. According to the latter, a check valve 19 opening to the pressure side is provided between the supply conduit 12 and the outlet conduit 13 and, together with the quantity setting apparatus 10, it forms a pilot unit 20.

A regulating valve 21 provided in the structural unit 6 acts as a priority valve and its piston 22 controls two valve cross-sections 23 and 24 in opposite senses. A fixed metering throttle 25 is provided in the supply conduit 12. The pressure on the one side of this metering throttle 25 is led by way of a pressure signal channel 26 into a pressure chamber 27 on the one side of the piston 22 of the regulating valve 21. The pressure on the other side of the metering throttle is led by way of a pressure signal channel 28 with a fixed throttle 29 into a pressure chamber 30 on the other side of the piston 22. It also contains a valve spring 31. An over-pressure valve 32 ensures that the pressure of the supply conduit 12 does not become too large.

In this way the regulating valve 21 is so controlled that a constant quantity of pressure medium flows through the supply conduit 12 irrespective of whether the quantity setting apparatus 10 is disposed in the neutral position (in which case the entire quantity is led to the outlet conduit 13 by way of the throttle cross-section 17) or whether on control of this quantity setting apparatus 10 this quantity or a part thereof is fed by way of the metering motor 16 into one of the control conduits 14 or 15. A second part of the quantity delivered by the pump 7 passes through an operating conduit 34 provided with a check valve 33 when the quantity setting apparatus 10 is actuated as will be explained more fully hereinafter. The remainder of the pressure medium conveyed by the pump 7 passes to an additional consumer by way of the valve cross-section 24 and the conduit 9.

A directional valve 35 comprises a slide 36 which either blocks the operating conduits 4 and 5 or connects one of these to the outlet 38 of an amplifier valve 39 by way of a valve cross-section 37 and the other to a conduit 41 leading to the container 8 by way of a valve cross-section 40. The slide 36 is loaded on one side by a spring 42 and the pressure of the control conduit 14 obtaining in a chamber 43. Acting on the other side there is a spring 44 and the pressure of the control conduit 15 obtaining in the chamber 45. Depending on whether the control conduit 14 or 15 is being fed with pressure medium by way of the metering motor 16, the slide 36 will be displaced to the right or left-hand side. This will open one of the two valve cross-sections 46 or 47 by way of which the control quantity flowing in the control conduit 14 or 15 is delivered to a conduit 48.

The amplifier valve 39 has a slide 49 which forms a first throttle position 50 and is subjected on the left-hand side by the pressure in the chamber 51 behind this throttle position and on the right-hand side in the chamber 52 by the pressure in the conduit 48. This ensures that the same pressure will obtain in the chamber 51 as in the conduit 48. The amplifier valve therefore forms a pressure regulator 53. The chamber 51 is connected to radial bores 55 by way of channels 54 and the chamber 52 is connected to radial bores 57 by way of channels 56. The radial bores 55 and 57 co-operate with a common annular groove 58. They therefore provide an operating valve 59 and a control valve 60 of which the cross-sections are changed proportionally. For example, one bore 57 can co-operate with radial bores 55.

The constructural unit 6 is also provided with conventional over-pressure valves 61 and 62 which respond when there is excessive pressure in one of the chambers of the servo-motor. Further, there are check valves 63 and 64 through which pressure medium can be sucked in when necessary.

In this arrangement, the supply conduit 12, the quantity setting apparatus 10, the control conduits 14 and 15, the throttle cross-sections 46 or 47, the conduit 48 and the control valve 60 form a control circuit 64 whilst the conduit 34, the pressure regulating valve 53 and the operating valve 59 form an operating circuit 66. The particular quantity flowing through the operating circuit 66 is proportional to the quantity flowing through the control circuit 65.

The manner of operation is as follows. In the neutral position, a predetermined quantity is fed to the container 8 by way of the supply conduit 12 and the short-circuit path 18. The regulating valve 21 sets itself so that the pressure drop at the throttle 25 has the valve required for this quantity. The piston 22 is therefore displaced out of its position where it blocks the valve cross-section 23 and is disposed in a preparatory operative position. If the manual steering wheel 11 is turned in one direction, a control quantity corresponding to the rotary speed is fed through the conduit 14. Consequently the slide 36 of the directional valve 35 is displaced to the right. The control quantity reaches the control valve 60 by way of the conduit 48. The pressure obtained in front of this valve displaces the slide 49 of the amplifier valve 39 to the left so that the throttle cross-section 50 of the pressure regulating valve 53 is opened. Consequently an operating quantity of the pressure medium flows through the amplifier valve 39 to the chamber 51 and is therefore at the same pressure in front of the operating valve 59 as is the control quantity in front of the control valve 60. Since both quantities are unified at the connection 38, they are subjected to the same pressure drop. Since the cross-sections of the operating valve 59 and control valve 60 vary proportionally, the operating quantity of the control quantity is likewise proportional. The thus amplified quantity flows through the directional valve and the motor conduit 4 to the servo-motor 1. Low pressure fluid flows by way of the motor conduit 5 directly through the conduit 41 to the container 8. If the steering wheel 11 is turned in the opposite direction, the control conduit 15 is supplied with the control quantity and the servomotor moves in the opposite direction.

The apparatus will also function if the pump 7 becomes inoperative. In that case, the metering motor 16 acts as a pump. Pressure fluid is sucked through the check valve 19 and fed to one of the control conduits 14 or 15. From there, it reaches the servo-motor 1 by way of the directional valve 35, the control valve 60 and the corresponding motor conduit.

Figure 3:
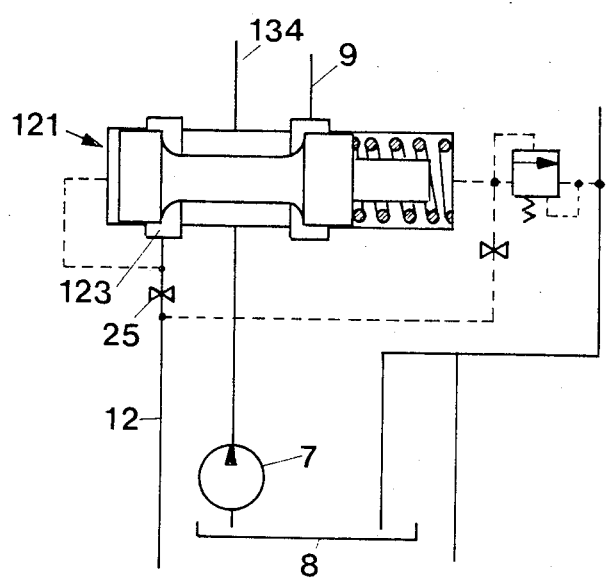
FIG. 3 is a fragmentary circuit diagram of a second embodiment.

In the FIG. 3 embodiment, the only difference is that the valve cross-section 123 of the regulating valve 121 merely controls the control quantity to the fixed metering throttle 25 in the supply conduit 12 whilst the operating conduit 134 is connected directly to the pump 7.

Since the two pressure signal channels 26 and 28 extend in the structural unit 6, they are short, only result in low pressure drops and cannot be damaged from the outside.

We claim:

1. A hydraulic steering control assembly, comprising, a bidirectional servomotor having two operating ports on opposite sides thereof, a pump and a tank, a steering wheel operated metering control unit having inlet and outlet ports and left and right control ports to which pressurized fluid may be selectively directed from said inlet port and returned from the other of said control ports to said outlet port, bidirectional valve means having inlet port means and outlet port means connected to said servomotor ports for selectively supplying and exhausting pressurized fluid therefrom, said bidirectional valve means having left turn inlet and outlet control ports and right turn inlet and outlet control ports, a two sided control circuit connected to said metering unit control ports and to said bidirectional valve means right and left turn inlet control ports, amplifier valve means having pressure regulating and control and power valve capabilities, said amplifier valve means having a slidable spool disposed in a valve housing having first and second inlet passage means and outlet passage means, said spool and said housing forming first and second chambers at opposite ends thereof, a regulating valve having an inlet connected to said pump and first and second outlets connected respectively to said metering control unit inlet port and said amplifier valve means first inlet passage means, a fixed metering throttle between said regulating valve and said metering control unit having the upstream and downstream sides thereof connected by pressure signal passages to opposite sides of said regulating valve for controlling said regulating valve in accordance with the pressure drop across said metering throttle to effect a substantially constant flow rate between said regulating valve and said metering control unit, a power circuit connected to said pump and to said amplifier valve means first input passage means, said spool having a first internal passage means having fluid communication with said first chamber and being in an adjustable throttling relationship with said first housing inlet passage means to regulate the pressure of said fluid thereat, said bidirectional valve means left and right turn outlet control ports being selectively connected via said metering control unit to said amplifier valve means second chamber and to said valve housing second inlet passage means, said spool having second internal passage means in constant fluid communication with said first internal passage means thereof and said housing second inlet passage means and said valve housing outlet passage means to combine pressure fluids from said control and power circuits, said valve housing outlet passage means being connected to said bidirectional valve means inlet port means to provide a common path for pressurized fluids from said power and control circuits.

2. A control assembly according to claim 1 characterized in that said fixed metering throttle is combined with regulating valve to a structural unit which also comprises said pressure signal passages.

3. A control assembly according to claim 2 characterized in that said structural unit also includes said amplifier valve means and said bidirectional valve means.

4. A control assembly according to claim 1 characterized in that said pump feeds said power circuit directly through said regulating valve.

5. A control assembly according to claim 1 characterized in that said fixed metering throttle and said regulating valve are so adapted to each other that the quantity flowing through said metering throttle is equal to the quantity necessary at maximum control speed of said metering control unit.

6. A control assembly according to claim 5 characterized in that the fluid quantity passed through said metering throttle is about 10 to 15% of the quantity delivered by said pump.

* * * * *